(12) United States Patent
Graversen et al.

(10) Patent No.: US 12,467,916 B2
(45) Date of Patent: Nov. 11, 2025

(54) METHOD FOR ESTIMATING ARTERIAL BLOOD VALUES

(71) Applicant: Roche Diagnostics A/S, Copenhagen V (DK)

(72) Inventors: Bruno Graversen, Hadsund (DK); Bjarne Flou, Hadsund (DK)

(73) Assignee: Roche Diagnostics A/S, Copenhagen V (DK)

( * ) Notice: Subject to any disclaimer, the term of this patent is extended or adjusted under 35 U.S.C. 154(b) by 194 days.

(21) Appl. No.: 16/770,785

(22) PCT Filed: Dec. 12, 2018

(86) PCT No.: PCT/EP2018/084530
§ 371 (c)(1),
(2) Date: Jun. 8, 2020

(87) PCT Pub. No.: WO2019/115605
PCT Pub. Date: Jun. 20, 2019

(65) Prior Publication Data
US 2021/0164966 A1 Jun. 3, 2021

(30) Foreign Application Priority Data
Dec. 12, 2017 (EP) .................................... 17206647

(51) Int. Cl.
*G01N 33/49* (2006.01)
*A61B 5/15* (2006.01)
(Continued)

(52) U.S. Cl.
CPC ......... *G01N 33/4925* (2013.01); *G16H 10/40* (2018.01); *G16H 50/30* (2018.01); *G16H 50/50* (2018.01); *A61B 5/15003* (2013.01)

(58) Field of Classification Search
CPC .... G01N 33/4925; G01N 33/49; G16H 10/40; G16H 50/30; G16H 50/50; G16H 50/70;
(Continued)

(56) References Cited

U.S. PATENT DOCUMENTS 5,922,607 A * 7/1999 Bernreuter ......... A61B 5/14551
436/805
6,029,076 A * 2/2000 Fiddian-Greene ..... A61B 5/036
600/353
(Continued)

FOREIGN PATENT DOCUMENTS

| JP | 20022301154 A | 10/2002 |
| WO | 2004010861 A2 | 2/2004 |

OTHER PUBLICATIONS

Kipnis, et al., "Monitoring in the Intensive Care", Hindawi Publishing Corporation Critical Care Research and Practice vol. 2012, 20 pages (Year: 2012).*
(Continued)

*Primary Examiner* — Amber A Misiaszek
(74) *Attorney, Agent, or Firm* — Thomas E. Lees, LLC (57) ABSTRACT

The present invention relates to method for providing values of measured and/or estimated arterial oxygenation ($SO2_{AM}$, $SO2_{AE}$, SpO2) based on measuring values of blood acid/base status in a venous blood sample ($VBGM$, $VBG_E$). A conversion of the venous blood values is made by applying a mathematical model for deriving blood acid/base status and oxygenation status into estimated or predicted arterial blood values ($ABG_P$). Furthermore, if a value of measured and/or estimated arterial oxygenation value is below a corresponding venous oxygenation value, then estimating the arterial oxygenation value is made with a replacement value being a function of the corresponding venous oxygenation value. The advantage is that converting venous blood value to arterial blood values will be possible by providing
(Continued)

arterialized blood gas and acid-base values for a higher percentage of clinical samples previously not possible.

8 Claims, 5 Drawing Sheets (51) Int. Cl.
*G16H 10/40* (2018.01)
*G16H 50/30* (2018.01)
*G16H 50/50* (2018.01)

(58) Field of Classification Search
CPC .............. A61B 5/15003; A61B 5/7278; A61B 5/14551
See application file for complete search history.

(56) References Cited

U.S. PATENT DOCUMENTS

| | | | | |
|---|---|---|---|---|
| 6,148,814 | A * | 11/2000 | Clemmer | A61M 16/024 600/529 |
| 6,743,172 | B1 * | 6/2004 | Blike | A61B 5/412 600/300 |
| 7,865,223 | B1 | 1/2011 | Bernreuter | |
| 11,330,996 | B2 * | 5/2022 | Al-Ali | A61B 5/14551 |
| 2003/0191373 | A1 * | 10/2003 | Blike | A61B 5/00 600/300 |
| 2006/0105319 | A1 | 5/2006 | Rees et al. | |
| 2007/0218559 | A1 | 9/2007 | Franco | |
| 2008/0200837 | A1 * | 8/2008 | Frazier | A61B 5/150236 600/573 |
| 2012/0065482 | A1 * | 3/2012 | Robinson | A61B 5/150389 600/309 |
| 2013/0345572 | A1 * | 12/2013 | Karbing | A61B 5/7278 600/484 |
| 2014/0275880 | A1 * | 9/2014 | Verkruijsse | A61B 5/14551 600/323 |
| 2015/0208950 | A1 * | 7/2015 | Akl | A61B 5/14551 600/323 |

OTHER PUBLICATIONS

Rees, "The Intelligent Ventilator (INVENT) Project: the role of mathematical models in translating psysiological knowledge into clinical practice", Computer Methods and Programs in Biomedicine, vol. 104, Dec. 2011.

Toftegaard et al., "Evaluation of a method for converting venous valves of acid-base and oxygenation status to arterial values", Emerg Med J, vol. 26, pp. 268-272, 2009.

International Search Report and Written Opinion pertaining to Application No. PCT/EP2018/084530 dated Mar. 25, 2019.

International Report on Patentability pertaining to Application No. PCT/EP2018/084530 dated Jun. 16, 2020.

Rees, et al., "A method for calculation of artial acid-based and blood gas status from measurements in the peripheral venous blood", Computer Methods and Programs in Biomedicine, pp. 18-25, 2006.

Toftegaard, "A mathematical model based method for converting venous values of acid-based and oxygenation status of arterial values", Aalborg Universiteit, 2010.

Tygesen, et al., "Mathemtaical arterialization of venous blood in emergency medicine patients", Lippincott Williams & Wilkins, vol. 00, No. 00, pp. 1-10, 2011.

Rees, et al., "Calculating acid-base and oxygenation status during COPD exacerbation using mathematically artialised venous blood", Aalborg University, pp. 1-8, 2012.

Rees, et al., "Converting venous acid-based and oxygen status to arterial in patients with lung disease", European Respiratory Journal, vol. 22, No. 5, pp. 1141-1147, 2009.

International Search Report in reference to co-pending Application No. PCT/DK 03/00512 filed Apr. 7, 2004.

Magnet, et al., "Capillary PO, does not adequately reftect arterial PO, in hypoxemic COPD patients", International Journal of COPD, vol. 12, pp. 2647-2653, 2017.

Rees, et al., "Mathematical modelling of the acid-base chemistry and oxygenation of blood: a mass balance, mass action approach including plasma and red blood cells", Eur. J. Appl. Physiol, vol. 108, pp. 483-494, 2010.

\* cited by examiner

METHOD FOR ESTIMATING ARTERIAL BLOOD VALUES

CROSS REFERENCE TO RELATED APPLICATIONS

This patent application is a national stage of International Application No. PCT/EP2018/084530, filed on Dec. 12, 2018, which claims the priority from European Application No. 17206647.4 filed Dec. 12, 2017 and titled "An Improved Method for Estimating Arterial Blood Values", both of the aforementioned applications are hereby incorporated by reference in their entireties.

FIELD OF THE INVENTION

The present invention relates to a computer-implemented method for converting venous blood values to arterial blood values, a corresponding computer-implemented data processing system for measuring blood values and converting venous blood values to arterial blood values, and a corresponding computer program product for executing the method on a computer system.

BACKGROUND OF THE INVENTION

Arterial blood gas analysis is a laboratory and point-of-care test routinely used to assess acid-base status along with adequacy of ventilation and oxygenation among predominantly critically/acute ill patients.

The assessment of acutely ill patients is a complex process involving evaluation of the patients numerous physiological systems, e.g. the pulmonary, metabolic, renal and circulatory systems. Much of the information necessary for this evaluation comes from analysis of the patients' blood. Blood samples can be taken from both arteries and veins. Arterial blood can be sampled either by placing an arterial catheter or cannula in the patient, or by performing an arterial puncture with a needle. Venous blood can be sampled from a cannula or a venous puncture at the periphery (peripheral venous blood); from a catheter placed in superior venal cava (central venous blood), or from a pulmonary arterial catheter placed in the pulmonary artery (mixed venous blood).

For patients residing in the intensive care unit (ICU), the use of indwelling catheters is common and provides easy access to arterial blood. In other departments arterial blood is typically collected via arterial punctures. Arterial punctures have shown to be more painful and unpleasant than venous sampling and carry a risk for side effects to the patient. For the clinical staff, arterial punctures are more complex and carry a risk as the collection system used poses a potential risk of needle stick injury as well as contamination from blood spill.

Many of the measurements taken from the blood, and used to assess the patient state, are similar in the venous and arterial blood samples. These included the electrolytes and such as sodium (Na), potassium (K), the haemoglobin concentration (Hb) and the concentration of abnormal forms of haemoglobin (e.g. carboxyhaemoglobin (COHb), methylhaemoglobin (MetHb)).

However, the acid-base status of arterial and venous blood is not the same, regardless of the site of sampling. The acid-base status refers, in general, to the following measurements in blood: the pH, the pressure of oxygen (pO2), the pressure of carbon dioxide (pCO2), the bicarbonate concentration (HCO3), the concentration of base higher than a reference condition (base excess (BE)), the concentration of bicarbonate at a reference pCO2 (standard bicarbonate SBC), the oxygen pressure (pO2) and the saturation of haemoglobin with oxygen (SO2) with pO2 and SO2 often being referred to as the oxygenation status of blood. The variation in acid-base status between arterial and venous blood is due to oxygen removal from the blood and carbon dioxide addition due to metabolism at the tissues.

Over the years, several initiatives have therefore been taken to reduce the need for arterial punctures, for example the method disclosed in international patent application WO 2004/010861 (to OBI Medical Aps, Denmark) for converting venous blood values to arterial blood values. Other relevant references may be REES S E: "The Intelligent Ventilator (INVENT) project: The role of mathematical models in translating physiological knowledge into clinical practice", COMPUTER METHODS AND PROGRAMS IN BIOMEDICINE, vol. 104, December 2011 (2011-12), pages S1-S29, TOFTEGAARD M: "A mathematical model based method for converting venous values of acid-base and oxygenation status to arterial values", PhD Thesis., 1 Jan. 2010 (Jan. 1, 2010), pages 1-49, and US patent application 2007/218559 AI (FRANCO WAYNE P [US]) 20 Sep. 2007 (Sep. 20, 2007).

The method in WO 2004/010861 has the advantage that arterial blood samples does not need be taken, and the disadvantages compared to venous blood samples when taking arterial blood samples are then eliminated. The method is essentially based on three steps, namely the first step of measuring arterial oxygenation, e.g. by pulse oximetry, the second step of measuring, preferably by anaerobic sampling, and estimating values of venous blood acid/base status and oxygenation status of a venous blood sample, including peripheral venous blood (PVBG) or central venous blood (CVBG), and the third step of converting the venous blood values by applying a mathematical model for deriving blood acid/base status and oxygenation status into the desired estimated arterial blood values, i.e. one or more values of the acid-base status in the arterial blood. The method described generally in WO 2004/010861 is now commercially available from OBI Aps under the trade name v-TAC™, cf. the web-page www.obimedical.com for further information.

However, an improved method converting venous blood values to arterial blood values would be advantageous, and in particular a more efficient and/or reliable method would be advantageous.

SUMMARY OF THE INVENTION

It is a further object of the present invention to provide an alternative to the prior art.

During clinical use for some patients of the method in WO 2004/010861, it has been found that when arterializing blood gas values for some patients and/or in some situations the method does not yield the desired output.

Among other factors, it has been found by the present inventors that due to pre-analytical and/or analytical errors during the blood gas analysis and/or if estimating the arterial oxygenation, for example using pulse oximetry where the accuracy of the measurement is typically limited, situations will occur where the corresponding venous oxygenation value will in fact be higher than the measured the arterial oxygenation.

The same situation occurs even more often when using VTAC methods, including v-TAC™, to fully arterialise capillary blood gas samples which may be poorly mechanically arterialised before sampling. Mechanically arterialised capillary samples will per definition be closer to the arterial values. This is clearly demonstrated by clinical example (2) in Table-1, where arterialisation of capillary blood by v-TAC failed in 13 of 40 data set (32.5%).

Thus, the problem is significant in that approximately 5% of patients in lung medicine when venous blood gas is used, and 20-50% of patients when using capillary blood gas, in the way that the clinician will not get arterial values, but instead will get an error message. As a consequence, the clinician will have to redo the measurement, such as performing an arterial puncture or capillary sampling. It should be emphasized that this significant problem has hitherto not been realized in this field, and the present invention may thereby constitute a solution to a previously unknown problem.

In particular, it may accordingly be seen as an object of the present invention to provide a computer-implemented method that solves the above previously unknown problem of the prior art with measurement of arterial oxygenation being too low for further use in a computer-implemented method for converting venous blood values to arterial blood values.

Thus, the above described object and several other objects are intended to be obtained in a first aspect of the invention by a computer-implemented method of converting venous blood values to arterial blood values, said method comprising:

a) providing values of measured and/or estimated arterial oxygenation
b) measuring and/or estimating values of blood acid/base status in a blood sample, the blood sample being obtained from venous blood,
c) converting the venous blood values by applying a mathematical model for deriving blood acid/base status and oxygenation status into estimated arterial blood values, wherein,
d1) if a value of measured and/or estimated arterial oxygenation value is below a corresponding venous oxygenation value,
e) then estimating the said arterial oxygenation value with a replacement value being a function of the corresponding venous oxygenation value.

The invention is particularly, but not exclusively, advantageous for providing a computer-implemented method for converting venous blood value to arterial blood values in a way that will be able to provide arterialized blood gas and acid-base values for a higher percentage of the clinical samples and resolve close to all situations (depending on settings), when the venous or capillary blood is already close to the arterial blood, and ensure an answer is provided for clinical use.

In the context of the present invention, it is to be understood that the term 'converting' is to be understood in a broad manner, i.e. as including—but not limited to—transforming or calculating from into one number into another number, using for example a computer-implemented data processing system.

In the context of the present invention, it is to be understood by a person skilled in physiology that the arterial and venous blood are closely interconnected, the arterial blood being oxygenated from in lungs and conveyed to the capillaries, where the oxygen is used in the metabolism, and subsequently conveyed back to the lungs. Depending on the context, there may accordingly be a gradual transition from arterial blood to capillary blood, and further from capillary blood to venous blood.

In the context of the present invention, the mathematical model for deriving or converting blood acid/base status and oxygenation value into estimated arterial blood values may be based on one, or more, of the following conditions (C1, C2 and/or C3), or model assumptions:

C1 The respiratory quotient ($RQ=VCO_2/VO_2RQ$) may be approximated by measurement of inspiratory and expiratory gases taken at the mouth, through the measurement of inspiratory oxygen ($FiO_2$) and carbon dioxide ($FiCO_2$) fraction and either end tidal fractions of oxygen ($Fe'O_2$) and carbon dioxide ($Fe'CO_2$) or mixed expired fractions of oxygen ($FeO_2$) and carbon dioxide ($FeCO_2$), preferably using the equations:

$$RQ = \frac{Fe'CO_2 - FiCO_2}{FiO_2 - Fe'O_2} \text{ or } RQ = \frac{FeCO_2 - FiCO_2}{FiO_2 - FeO_2},$$

C2 Approximation of RQ by the above assumption C1 may often give values which can vary substantially. However, the true value of RQ at the tissues can only vary between 0.7-1.0, being 0.7 in aerobic metabolism of fat and 1.0 in aerobic metabolism of carbohydrate, and/or C3 A mathematical model of blood acid/base and oxygenation status can be used to perform a simulation, where $O_2$ is added and $CO_2$ removed from the venous blood in a ratio determined by a constant respiratory quotient (RQ) set to be within the physiologically possible range 0.7-1.0 from the above condition C2. This simulation may then be performed until the simulated oxygen saturation is equal to that estimated or measured in condition C2, i.e. that in arterial blood.

Particularly, conditions C2 and C3 have been found by the present inventors to provide advantageous results.

See also WO 2004/010861 (to OBI Medical Aps, Denmark), which is hereby incorporated by reference in its entirety, and the related scientific article "*A method for calculation of arterial acid-base and blood gas status from measurements in the peripheral venous blood*" by Rees et al. in *Computer methods and programs in biomedicine* 81 (2006) pages 18-25, which is also hereby incorporated by reference in its entirety, for more details of a specific model, but other models, or variants thereof, may be applied within the context and principle of the present invention as the skilled person will readily understand.

In the context of the present invention, it is to be understood that providing, measuring, and/or estimating blood values from a blood sample does not necessarily include the specific step of taking or extracting a blood sample from a patient, thus measurements results may be obtained, transferred, communicated etc. from another entity or person, e.g. a nurse, having performed a blood measurement or extraction.

In the context of the present invention, it is to be understood that when receiving a result of the invention, i.e. by converting venous blood values to arterial blood values, the resulting arterial blood values may subsequently be used in a decision process by a clinician or medically trained person. It is contemplated that the decision process may be automated e.g. as a part of a computer-implemented decision support system (DSS). Thus, if arterial blood values are outside of physiologically acceptable or normal levels for the specific patient under the specific circumstances, subsequent clinical actions or remedies may be initiated or recommended, e.g. if arterial blood values for oxygenation are too low, for example hypoxemia may be an indication of a disease, or illness, related to breathing and/or circulation, such as anemia, COPD, asthma or heart disease etc.

In one embodiment, values of measured arterial oxygenation may be provided by pulse oximetry (SpO2) or other means for measuring, non-invasively or invasively, arterial oxygenation.

In one embodiment, if condition d1) is fulfilled—then the method may comprises an additional condition d2) if further the numerical difference between said measured and/or estimated arterial oxygenation value and said corresponding venous oxygenation is below a predefined threshold level (K), e.g. 1, 2, 3, 4, 5, 6, 7, 8, 9, or 10 percent, as an additional requirement for initiating e), which has been found useful in clinical tests performed. Further, for the condition d2) said predefined threshold level (K) may be depending on a measurement uncertainty from a measurement device used in providing values of arterial oxygenation in a), e.g. pulse oximetry, and/or a measurement uncertainty from a measurement device used in providing values of blood acid/base status in a venous blood sample in b), e.g. blood gas analysis equipment.

Beneficially, for the process of e) estimating the said arterial oxygenation value with a replacement value being a function of the corresponding venous oxygenation value, said function may comprise a model of the arterial blood gas and acid-base status and is arranged for predicting an arterial oxygenation value.

Advantageously, wherein for the process of e) estimating the said arterial oxygenation value with a replacement value being a function of the corresponding venous oxygenation value, said replacement value may be equal to said venous oxygenation value as an embodiment.

In some embodiment, for the process of e) estimating the said arterial oxygenation value with a replacement value being a function of the corresponding venous oxygenation value, the replacement value may adapted to compensate for one or more pre-analytical and/or analytical errors in the measurement and/or estimation of venous blood gas and acid-base status, e.g. in blood gas measurement means or equipment, and/or measured and/or estimated arterial oxygenation, e.g. by pulse oximetry.

In other embodiments, for the process of e) estimating the said arterial oxygenation value with a replacement value being a function of the corresponding venous oxygenation value, the replacement value may be adapted to compensate for a minimum expected metabolism of oxygen resulting in a corresponding difference between arterial blood gas and acid-base status (ABG) and venous blood gas and acid-base status (VBG), as the metabolism may be estimated.

In beneficial embodiments, for the process of e) estimating the said arterial oxygenation value with a replacement value being a function of the corresponding venous oxygenation value, the said function may comprise a model of the arterial blood gas and acid-base status and is arranged for predicting an arterial oxygenation value using measured and/or estimated venous blood gas and acid-base status ($VBG_M$), such as a physiological model, in particular a model forming part of the VTAC and/or cooperating with VTAC. Furthermore, the said measured venous blood gas and acid-base status ($VBG_M$) may be further adjusted to compensate for one or more analytical errors in the measurement of venous blood gas and acid-base status ($VBG_M$). Additionally or alternatively, the said measured venous blood gas and acid-base status ($VBG_M$) may be further adjusted to compensate for a minimum expected metabolism of oxygen resulting in a corresponding difference between arterial blood gas and acid-base status (ABG) and venous blood gas and acid-base status (VBG) yield even better results.

In advantageous embodiments, the process of c) converting the venous blood values by applying a mathematical model for deriving blood acid/base status and oxygenation status into estimated arterial blood values ($ABG_P$), may be modified in that for the measured venous blood values ($VBG_M$) oxygen is removed and/or carbon dioxide is added for modeling purposes to yield even better results. Particularly, the oxygen may be removed and/or the carbon dioxide may be added for modeling purposes being limited to a range of physiological possible values. Additionally, the estimated arterial blood values may be calculated within said range of physiological possible values.

In some embodiments, for the condition of d2) said predefined threshold level (K) may be depending on physiologically based safety margins as the skilled person will appreciate once the general teaching of present invention is understood.

In some embodiments, the mathematical model may apply that the true value of respiratory quotient (RQ) at the tissues can only vary between 0.7-1.0, being 0.7 in aerobic metabolism of fat and 1.0 in aerobic metabolism of carbohydrate. Additionally, or alternatively, in other embodiments, the mathematical model may apply that oxygen O2 is added and carbon dioxide CO2 removed from the venous blood in a ratio determined by a constant respiratory quotient (RQ), set to be within the physiologically possible range 0.7-1.0, and performing a simulation until the simulated oxygen saturation is equal, or substantially equal, to that estimated or measured in arterial blood.

In the context of the present invention, the following definitions and abbreviations will be used:

| Abbreviation | Meaning |
| --- | --- |
| BGA | Blood Gas Analyzer - instrument to measure acid-base and blood gas status in blood |
| ABG | Arterial Blood Gas and acid-base |
| VBG | Venous Blood Gas and acid-base |
| PVBG | Peripheral Venous Blood Gas and acid-base |
| CVBG | Central Venous Blood Gas and acid-base |
| CBG | Capillary Blood Gas and acid-base |
| $ABG_M$ | Arterial blood gas values, measured by a blood gas analyser or a similar instrument or method. |
| $VBG_M$ | Venous (or capillary) blood gas values, measured by a blood gas analyser or a similar instrument or method. |
| v-TAC ™ | The v-TAC ™ software, based on the patented method for mathematical arterialisation of venous blood, cf. WO 2004/010861 (to OBI Medical Aps, Denmark), which is hereby incorporated by reference in its entirety. |
| VTAC | Any mathematical algorithm, equation, formula, model, computer program or mechanism, such as but not limited to the v-TAC ™ software, for calculation of $ABG_P$ values from blood, such as but not limited to venous or capillary blood |
| $ABG_P$ | Predicted arterial blood gas values, calculated by a VTAC method, or estimated by other means |
| $SO_{2AM}$ | The oxygen saturation level of the arterial blood, measured by a BGA or by other means |
| $SO_{2VM}$ | The oxygen saturation level of the venous or the capillary blood, measured by a BGA or by other means |
| $SO_{2AE}$ | The oxygen saturation level of the arterial blood measured by other means than a blood gas analyser, such as but not limited to, pulse oximetry, or estimated by other means |
| SpO2 | Arterial saturation level measured by pulse oximetry |
| SD | Statistical Deviation (statistic term) |

Thus, in general the subscript 'A' means arterial, the subscript 'V' means venous, the subscript 'M' means measured, the subscript 'E' means estimated, the subscript 'P' means predicated etc. In some of the Figures and/or description, the subscript may not be written as a subscript for practical reasons, e.g. 'SO2V', but it will be understood by the skilled person what the technical meaning is.

In a second aspect, the invention relates to a data processing system for converting venous blood values to arterial blood values, preferably computer implemented, said data processing system comprising:

means for providing values of measured and/or estimated arterial oxygenation, means for measuring and/or estimating values of blood acid/base status in a blood sample, the blood sample being obtained from venous blood, and means for converting the venous blood values by applying a mathematical model for deriving blood acid/base status and oxygenation status into estimated arterial blood values, wherein—if a value of measured and/or estimated arterial oxygenation value is below a corresponding venous oxygenation value—then estimating the said arterial oxygenation value with a replacement value being a function of the corresponding venous oxygenation value.

In a third aspect, the invention relates to a computer program product being adapted to enable a computer system comprising at least one computer having data storage means in connection therewith to control a system according to the second aspect of the invention.

This aspect of the invention is particularly, but not exclusively, advantageous in that the present invention may be accomplished by a computer program product enabling a computer system to carry out the operations of the system of the second aspect of the invention when down- or uploaded into the computer system. Such a computer program product may be provided on any kind of computer readable medium, or through a network.

The individual aspects of the present invention may each be combined with any of the other aspects. These and other aspects of the invention will be apparent from the following description with reference to the described embodiments.

BRIEF DESCRIPTION OF THE FIGURES

The method according to the invention will now be described in more detail with regard to the accompanying figures. The figures show one way of implementing the present invention and is not to be construed as being limiting to other possible embodiments falling within the scope of the attached claim set.

DETAILED DESCRIPTION OF AN EMBODIMENT

Figure 1:
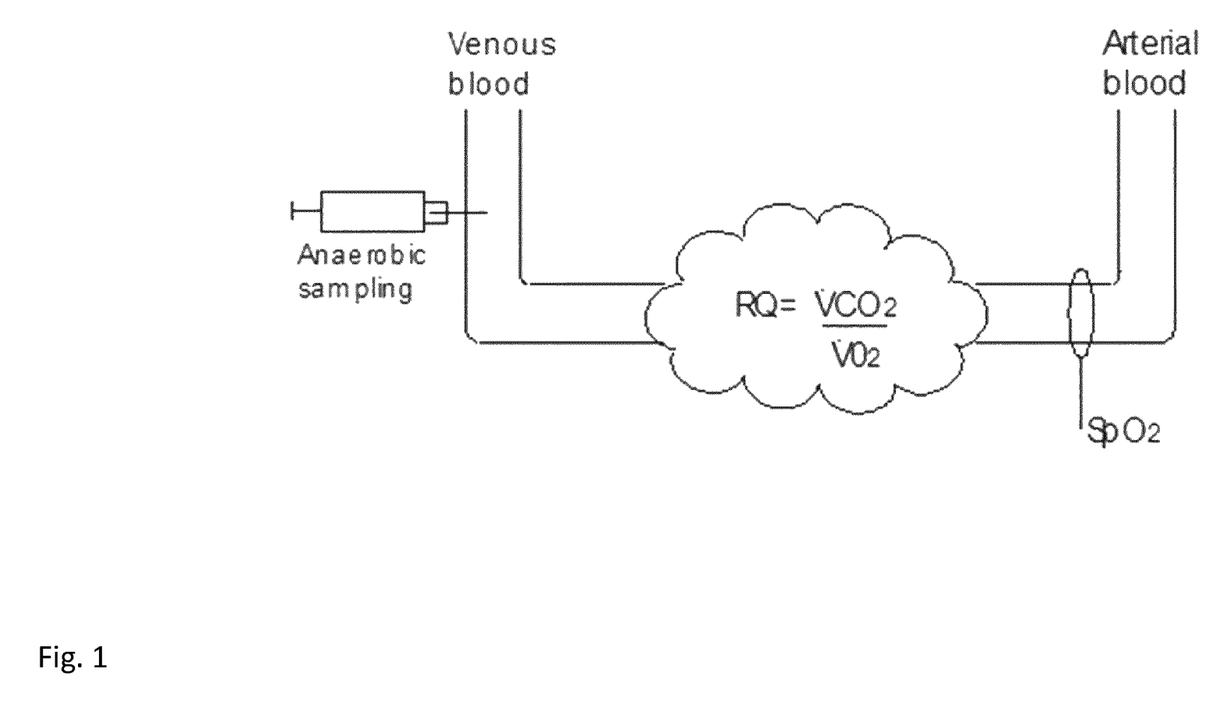
FIG. 1 is a schematic overview of the blood flow in a subject.

FIG. 1 is a schematic overview of the blood flow in a subject or patient schematically showing a computer-implemented method for performing the prediction of arterial blood acid-base status values from an anaerobically sampled venous blood sample using the vTAC™ method as disclosed in WO 2004/010861 (to OBI Medical Aps, Denmark).

Arterial blood gasses values are, as an example, estimated or predicted as given in the four steps below.

Step 1: An anaerobic venous blood sample is drawn and analysed using standard blood gas analysis technology to provide a picture of the acid/base status of the venous blood ($SBC_v$, $pH_v$, $pCO_{2v}$, $BE_v$, $pO_{2v}$, and $SO_{2v}$).

Step 2: The arterial oxygen saturation is estimated or measured non-invasively, possibly by pulse oximetry.

Step 3: For a blood sample passing through the tissues from the arteries into the veins, the ratio of the amount of CO2 added (i.e. the rate of CO2 production (VCO2)) and O2 removed (i.e. the rate of O2 utilisation (VO2)), due to aerobic metabolism is defined as the respiratory quotient ($RQ=VCO_2/VO_2$). RQ is often approximated by measurement of inspiratory and expiratory gases taken at the mouth, through the measurement of inspiratory oxygen ($FiO_2$) and carbon dioxide ($FiCO_2$) fraction and either end tidal fractions of oxygen ($Fe'O_2$) and carbon dioxide ($Fe'CO_2$) or mixed expired fractions of oxygen ($FeO_2$) and carbon dioxide ($FeCO_2$) using the equations:

$$RQ = \frac{Fe'CO_2 - FiCO_2}{FiO_2 - Fe'O_2} \text{ or } RQ = \frac{FeCO_2 - FiCO_2}{FiO_2 - FeO_2}$$

Approximation of RQ by this method often gives values which can vary substantially. However, the true value of RQ at the tissues can only vary between 0.7-1.0, being 0.7 in aerobic metabolism of fat and 1.0 in aerobic metabolism of carbohydrate. In this step a mathematical model of blood acid/base and oxygenation status is used to perform a simulation, where $O_2$ is added and $CO_2$ removed from the venous blood in a ratio determined by a constant respiratory quotient, set to be within the physiologically possible range 0.7-1.0. This simulation is performed until the simulated oxygen saturation is equal to that estimated or measured in step 2, i.e. that in arterial blood.

Step 4: The model of blood acid/base and oxygenation status is then used to calculate a picture of the acid/base status and the oxygenation of the arterial blood ($SBC_{ap}$, $pH_{ap}$, $PCO_{2ap}$, $BE_{ap}$, $PO_{2ap}$ and $SO_{2ap}$). This is possible as the simulated removal of $CO_2$ and $O_2$ from venous blood at a fixed RQ ensures that when the simulated arterial oxygenation matches that measured, then the simulated values of other arterial acid-base variables should also match those measured.

For the purpose of testing the venous to arterial conversion method the predictions of arterial acid base status ($SBC_{ap}$, $pH_{ap}$, $pCO_{2ap}$, $BE_{ap}$, $PO_{2ap}$ and $SO_{2ap}$) obtained from the method can be compared against those measured ($SBC_a$, $pH_a$, $PCO_{2a}$, $BE_a$, $PO_{2a}$ and $SO_{2a}$).

The fundamental assumption contained in this method is that little or no anaerobic metabolism occurs across the tissue where the venous blood sample is taken. If anaerobic metabolism were present then this would result in two effects, the base excess in the arterial and venous blood would be different, and the strong acid produced by this process ($H^+$) would bind with bicarbonate ($HCO3^-$) in the blood to form $CO_2$ in the following reversible reaction $$H^+ + HCO_3^- \rightleftharpoons CO_2 + H_2O$$

The increase in $CO_2$ production by this reaction would mean that the apparent $VCO_2$ would be increased without an increase in $VO_2$, meaning that conversion of venous values to arterial values using a constant RQ would not be correct. The degree of anaerobic metabolism depends upon the circulatory and metabolic state of the patient.

In a normal well perfused peripheral limb it is unlikely that anaerobic metabolism occurs. The quality of perfusion of a limb can be assessed clinically by the presence of a clearly recognizable arterial pulse determined by palpation, a normal capillary response, and a normal color and temperature of the limb. Central or mixed venous blood is a mixture of blood from several sites and may therefore contain blood from an area of the body with anaerobic metabolism. The selection of the sample site is therefore important.

See also WO 2004/010861 (to OBI Medical Aps, Denmark), which is hereby incorporated by reference in its entirety, and the related scientific article "*A method for calculation of arterial acid-base and blood gas status from measurements in the peripheral venous blood*" by Rees et al. in *Computer methods and programs in biomedicine* 81 (2006) pages 18-25, which is also hereby incorporated by reference in its entirety.

Figure 2:
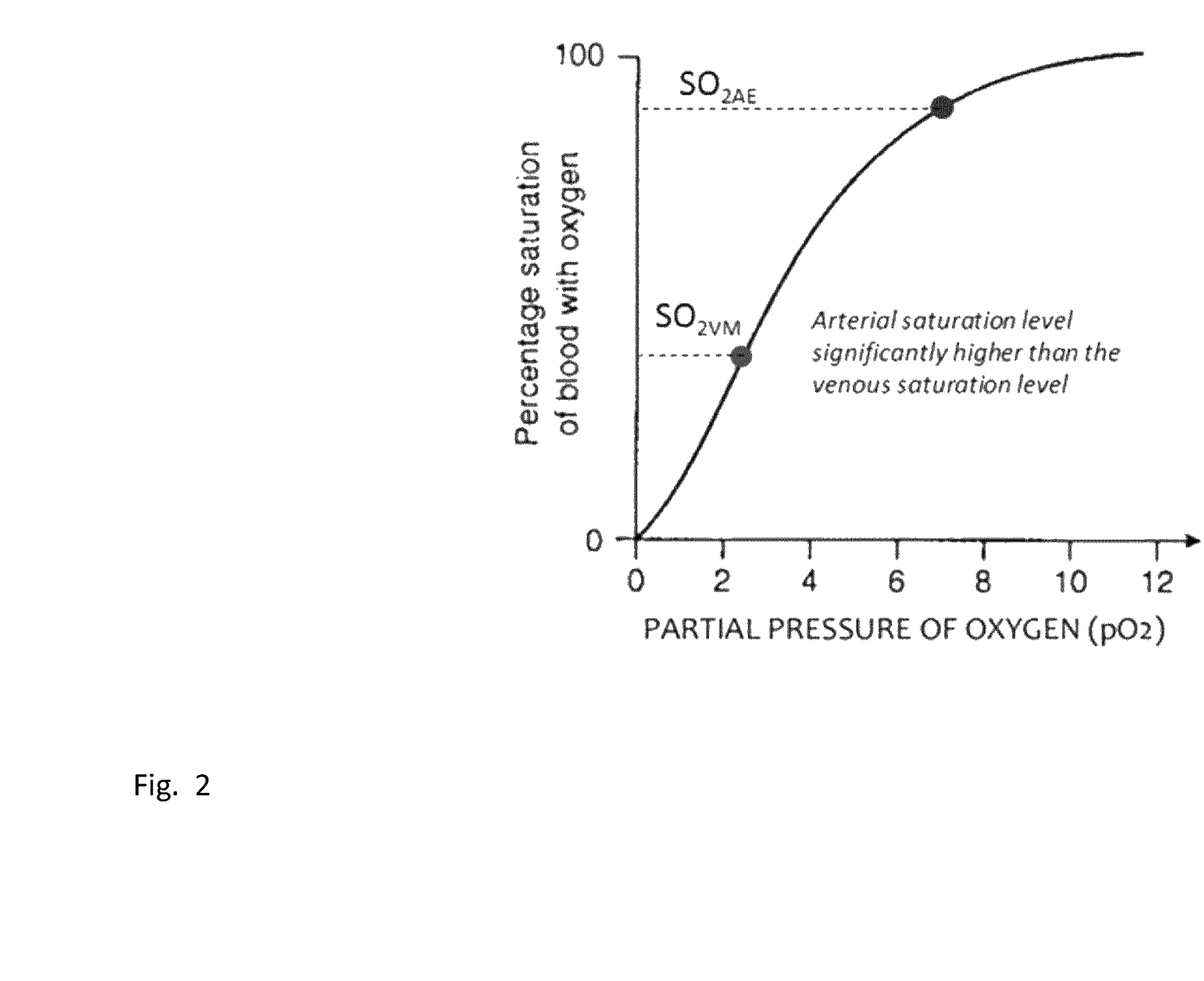
FIGS. 2-4 shows graphs of oxygen dissociation curves (ODC) in three situations.
Figure 3:
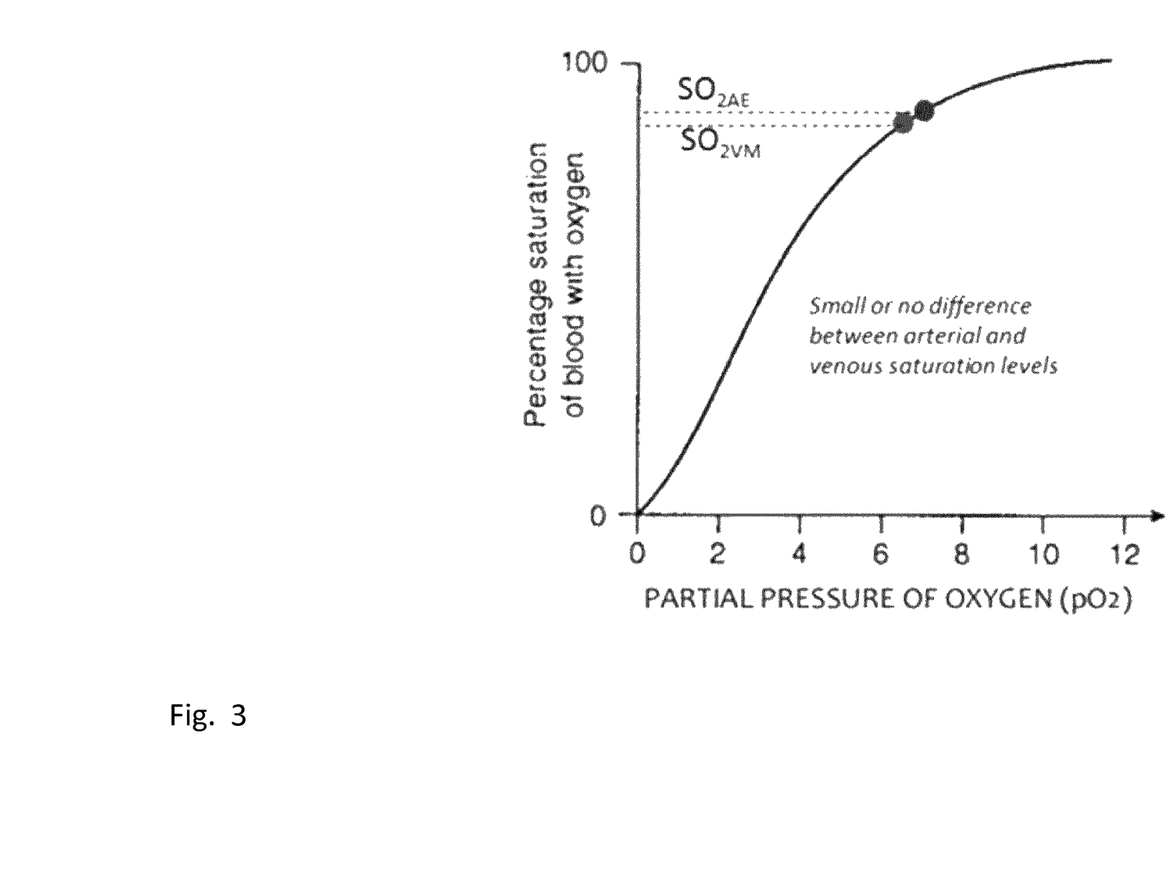
Figure 4:
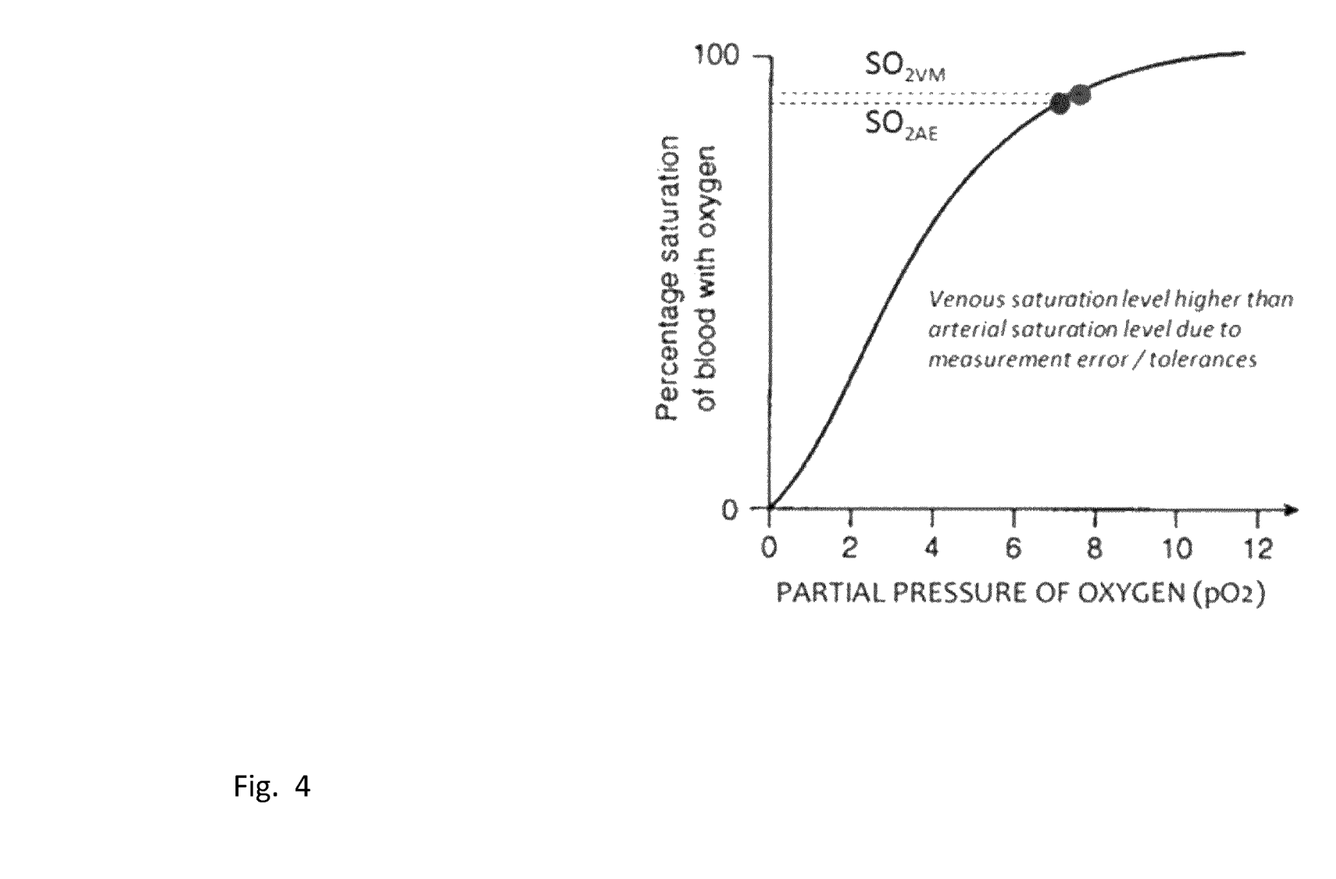

FIGS. 2-4 shows graphs of oxygen dissociation curves (ODC) in three situations.

When using VTAC to arterialize blood gas values, the method may require a SO2AE as input. As oxygen cannot be added to the blood on its way through the tissues, the venous or capillary SO2 cannot, per definition, be higher than the corresponding arterial SO2 for a matching sample pair. FIG. 2-4 show ODC-curves for matching pairs with three (3) VBG samples represented in FIGS. 2, 3 and 4, respectively, and one (1) ABG marked ABG (but represented in all three graphs).

FIG. 2 illustrates an example with large difference between the oxygen saturation of the venous or capillary, and the arterial blood.

FIG. 3 illustrates an example with very small or no difference between the oxygen saturation of the venous or capillary, and the arterial blood.

FIG. 4 illustrates an example, where the arterial blood is less saturated than the venous/capillary blood (which is not physical plausible and a result of measurement error or tolerances).

However, in real-world settings and due to pre-analytical and analytical errors during the blood gas analysis and/or if estimating the $SO2_{AE}$ for example using pulse oximetry where the accuracy of the measurement is typically within ±4% (2×SD), situations like in FIG. 4 will occur, where the $SO2_{VM}$ will be higher than the $SO2_{AE}$. The same situation will occur even more often when using VTAC methods to arterialise poorly mechanically arterialised capillary blood samples.

In such cases, when the $SO2_{AE}$ is below the oxygen saturation level from the blood gas measurement $SO2_{VM}$, VTAC cannot arterialize the blood gas values using known mechanisms, and hence the clinician does not get an answer and will have to redo the measurement using an alternative method, such as a usual arterial or capillary blood gas measurement.

This method according to the invention resolves this issue and ensures that the clinician gets an answer in situations where data allows providing a clinical relevant result.

The magnitude of the problem becomes clear, when reviewing data from clinical studies and customer data from customers using the v-TAC™ method for arterialisation of venous or capillary blood.

TABLE 1

Statistics of $SO2_{VM} > SO2_{AM}$
Total N = 395

| Patient cohort | Origin of blood | Arterialization possible $SO2_{AE} \geq SO2_{VM}$ | Failure (no answer) |
|---|---|---|---|
| (1) Lung Medicine | VBG | 97.1% | 2.9% |
| (2) Lung Medicine | CBG | 67.5% | 32.5% |
| (3) Lung Medicine | VBG | 92.2% | 7.8% |
| (4) Intensive | VBG | 94.9% | 5.1% |
| (5) Intensive | VBG/ PVBG/ CVBG | 98.6% | 1.4% |

Based on the data from the above Table 1, it is estimated up to 10% of patients in lung medicine will be impacted, and between 20-50% of patients when using capillary blood gas, in the way that the clinician will not get arterial values, but instead will get an error message.

Advantages Using the Present Invention

With this method, VTAC solutions, such as the specific v-TAC™ software, will be able to provide arterialized blood gas and acid-base values for a higher percentage of the samples and resolve close to all situations (depending on settings), when the venous or capillary blood is already close to the arterial blood, and ensure an answer is provided. The yield for the patient groups referenced in the section above will increase as shown below if the rule is (example only, using 4% cut-off as maximum acceptable difference between $SO2_{VM}$ and $SO2_{AE}$ where SO2AE is estimated using pulse oximetry):

If $SO2_{VM} \geq SO2_{AE}$
1) If $SO2_{VM} - SpO2 > 4\% \rightarrow$ do not deliver results
2) If $SO2_{VM} - SpO2 \leq 4\% \rightarrow$ use $SO2_{VM}$ as $SO2_{AE}$ for the arterialization

TABLE 2

Change in VTAC success and failure rate
Total N = 395

| Patient cohort | Origin of blood | Arterialization possible | Failure rate with method | Failure rate without method |
|---|---|---|---|---|
| (1) Lung Medicine | VBG | 100% | 0% | 2.9% |
| (2) Lung Medicine | CBG | 100% | 0% | 32.5% |
| (3) Lung Medicine | VBG | 98.1% | 1.9% | 7.8% |
| (4) Intensive | VBG | 100% | 0% | 5.1% |
| (5) Intensive | VBG CVBG PVBG | 100% | 0% | 1.4% |

The analysis from the various results represented in the above Table 2 shows that the method with the settings described will increase the yield for the mathematical arterialization significantly. Of the 395 patients will arterialization not succeed for 29 patients without the method, but only for 2 patients with the method according to the present invention. Notice that Table 2 shows results for five different clinical studies of various patients groups.

Significant lower $SO2_{AE}$ than $SO2_{VM}$ is unlikely to be due to tolerances but is more likely to pre-analytical or analytical errors, in which case these will be rejected (see example in (3) from lung medicine, where 2 samples are not handled even with the method, because the SpO2 measured was more than 4% below the $SO2_{VM}$).

Figure 5:
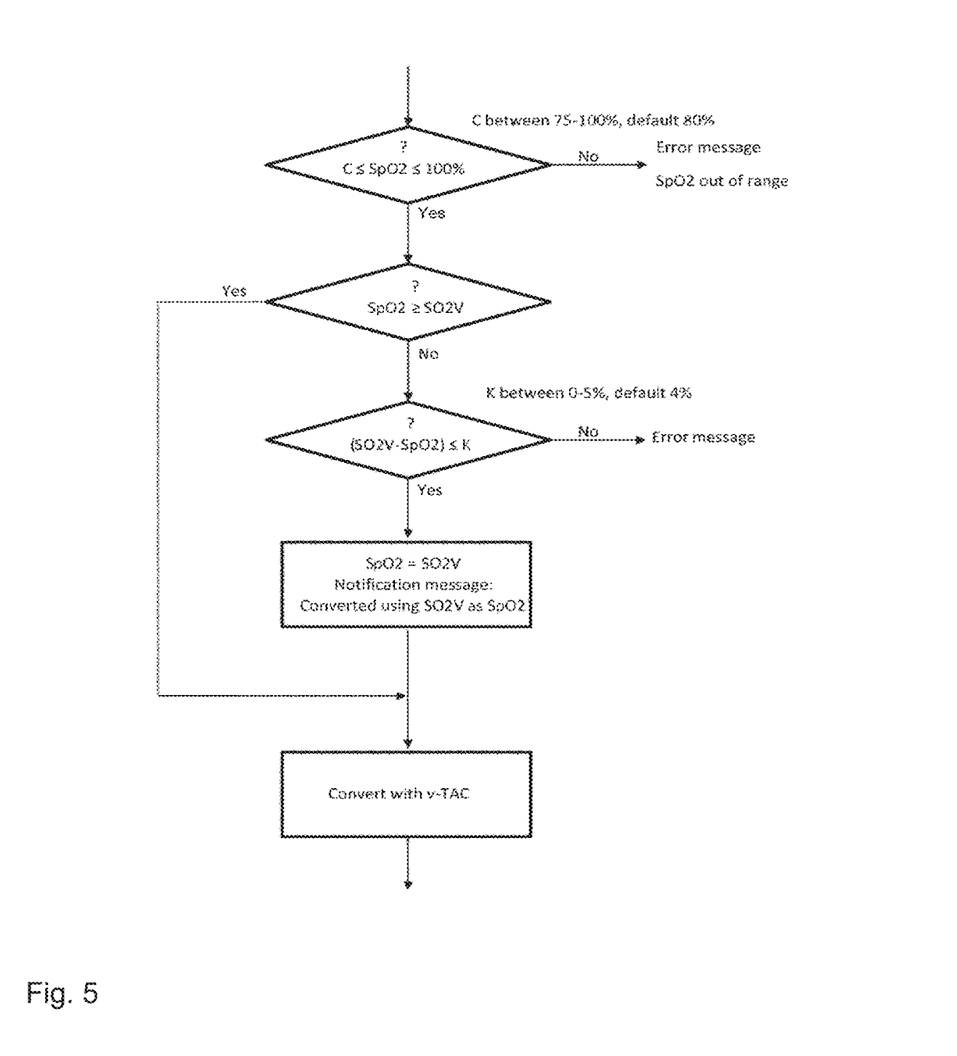
FIG. 5 is a schematic system-chart representing an outline of/in detail the operations of a computer-implemented method according to the invention.

FIG. 5 is a schematic system-chart representing an outline of/in detail the operations of a method according to the invention.

The invention according to one embodiment may be implemented by changing the SpO2 acceptance criteria from "SpO2>SO2V" to "SpO2>SO2V−K", where K is a configurable constant default to four (4) percent.

Four (4%) is chosen in this embodiment, because this will resolve the problem and the 4% is the normally applied 2×SD for pulse oximetry and hence useful to compensate for variation in SpO2 measurement.

In situations where SpO2 is lower than SO2 according to the criteria above, the SO2 from the VBG or CBG measurement (or ABG, if the sample was arterial blood) will be used as SpO2 level for the conversion by v-TACT.

In most cases this will mean that the VBG/CBG/ABG measure values will transform directly into the values report by v-TAC, but by taking the values through the v-TAC software, the plausibility checks, such as accepted range of DPG, will be performed, and the pO2 level will be cut at 10 kPa.

All measurements which falls into the category where SpO2 is marginally lower than SO2V will be reported with a notification saying:

Notification: SpO2 x % below SO2V; SO2V used as SpO2 for conversion where x=SpO2−SO2V All measurements where SpO2 is more than 4% lower than SO2V will trigger an error message saying:

Error: SpO2 x % below SO2V; Conversion not possible where x=SpO2−SO2V

Risks

The potential risks incurred by this new acceptance criteria have been intensively reviewed over a period of time, and no significant risks were found as a consequence of the change due to:

SpO2 accepted range remains 75-100% (constant C in FIG. 5)

If SpO2 is marginally under estimated by the pulse oximeter, or entered incorrectly by the operator, the value used for conversion is the SO2.

If SpO2 is significantly under estimated by the pulse oximetry, or entered incorrectly by the operator, v-TAC reports error message.

In short, the present invention relates to method for providing values of measured and/or estimated arterial oxygenation, e.g. $SO2_{AM}$, $SO2_{AE}$, SpO2, based on measuring values of blood acid/base status in a venous blood sample, e.g. $VBG_M$, $VBG_E$. A conversion of the venous blood values is made by applying a mathematical model for deriving blood acid/base status and oxygenation status into estimated or predicted arterial blood values, e.g. $ABG_P$. Furthermore, if a value of measured and/or estimated arterial oxygenation value is below a corresponding venous oxygenation value, then estimating the arterial oxygenation value is made with a replacement value being a function of the corresponding venous oxygenation value. The advantage is that converting venous blood value to arterial blood values will be possible by providing arterialized blood gas and acid-base values for a higher percentage of clinical samples previously not possible.

The invention can be implemented by means of hardware, software, firmware or any combination of these. The invention or some of the features thereof can also be implemented as software running on one or more data processors and/or digital signal processors i.e. data processing on one, or more, computers The individual elements of an embodiment of the invention may be physically, functionally and logically implemented in any suitable way such as in a single unit, in a plurality of units or as part of separate functional units. The invention may be implemented in a single unit, or be both physically and functionally distributed between different units and processors.

Although the present invention has been described in connection with the specified embodiments, it should not be construed as being in any way limited to the presented examples. The scope of the present invention is to be interpreted in the light of the accompanying claim set. In the context of the claims, the terms "comprising" or "comprises" do not exclude other possible elements or steps. Also, the mentioning of references such as "a" or "an" etc. should not be construed as excluding a plurality. The use of reference signs in the claims with respect to elements indicated in the figures shall also not be construed as limiting the scope of the invention. Thus, in the below claims some reference signs have inserted in parentheses for example:

$SO2_{AM}$, $SO2_{AE}$, and/or SpO2 as values of measured and/or estimated arterial oxygenation, $VBG_M$, $VBG_E$ for measuring and/or estimating values of blood acid/base status in a venous blood sample, and/or $ABG_P$ for estimated arterial blood values, and the skilled person in the field will readily understand that these specific abbreviations of measured and/or estimated values are merely illustrating some specific values (some of which are also shown in the figures) within the context and principle of the present invention, but other specific values may be applied alternatively or additionally, and used for the technical aim and purpose achieved by the present invention.

Furthermore, individual features mentioned in different claims, may possibly be advantageously combined, and the mentioning of these features in different claims does not exclude that a combination of features is not possible and advantageous.

The invention claimed is:

1. A blood gas analysis system comprising:
a pulse oximeter configured to acquire arterial oxygen saturation information;
an anaerobic venous blood sampling device;
a user interface configured to receive:
an arterial oxygen saturation value that has been acquired from the pulse oximeter; and
a venous acid-base status that has been acquired from the anaerobic venous blood sampling device, the acid-base status comprising at least one of a pH value, a partial pressure of carbon dioxide value and a partial pressure of oxygen value; and
a processor cooperative with a computer readable medium to operate a computer model that predicts a conversion of venous blood values to arterial blood values, wherein the blood gas analysis system is configured such that it does not need to acquire blood gas information from an arterial puncture blood sample in order to perform an arterial blood gas analysis on a patient but instead is configured such that the computer model estimates an arterial oxygenation value and arterial acid-base status through a simulated metabolism and the received venous blood values, such that if the estimated arterial oxygenation value is:
(a) less than a corresponding venous oxygenation value by less than a predefined threshold, the computer model uses a replacement value being a function of the corresponding venous oxygenation value instead of the estimated arterial oxygenation value;

(b) less than the corresponding venous oxygenation value by more than a predefined threshold value, the computer model generates an error message; or (c) at least as great as the corresponding venous oxygenation value, the computer model retains the estimated arterial oxygenation value;

wherein the blood gas analysis system is further configured to present results of the arterial blood gas analysis through the user interface, the results comprising one of (i) an arterial acid-base status of the patient based on the corresponding venous oxygenation value, (ii) the error message or (iii) an arterial acid-base status of the patient based on the retained estimated arterial oxygenation value.

2. The blood gas analyser of claim 1, wherein the acid-base status further comprises at least one haemoglobin concentration value.

3. The blood gas analyser of claim 1, wherein the at least one haemoglobin concentration value comprises an abnormal form of haemoglobin.

4. The blood gas analyser of claim 3, wherein the abnormal form of haemoglobin comprises at least one of a carboxyhaemoglobin value and a methylhaemoglobin value.

5. The blood gas analyser of claim 3, wherein the predefined threshold value comprises a measurement uncertainty in a measurement device used to acquire the venous blood sample.

6. The blood gas analyser according to claim 1, wherein the mathematical model is adapted to compensate for at least one of (i) pre-analytical or analytical errors in the received venous blood values and (ii) the received arterial oxygen saturation value.

7. The blood gas analyser according to claim 1, wherein the mathematical model is adapted to transform the acquired venous blood gas values into corresponding arterial blood gas values based on:

a minimum expected metabolic removal of oxygen within the patient;

the received arterial oxygen saturation value; and a constant respiratory quotient set within a physiologically possible range that corresponds to inspired and expired fractions of $O_2$ and $CO_2$.

8. The blood gas analyser according to claim 7, wherein the constant respiratory quotient corresponds to a physiologically possible range of 0.7 to 1.0.

* * * * *